(No Model.)
E. S. HIGGINS & H. C. JENKINS.
JOINT FOR TYPE WRITING MACHINES.
No. 502,190. Patented July 25, 1893.
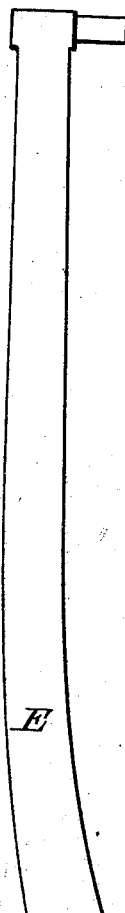
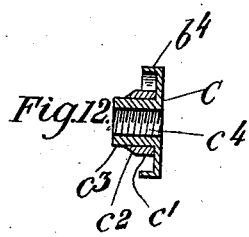
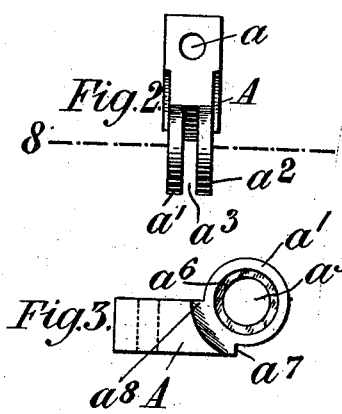
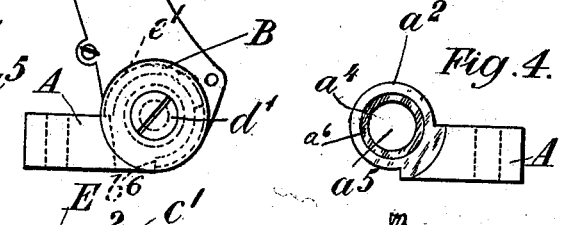
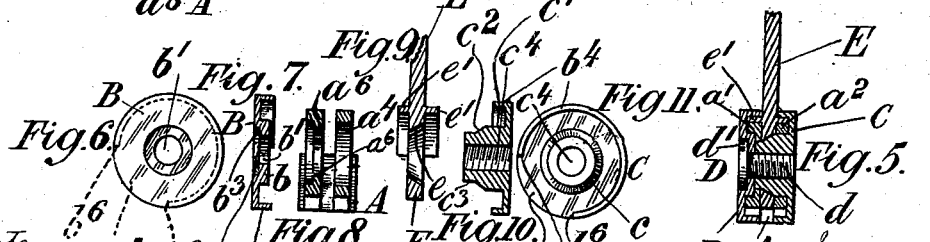
Attests
A. N. Dobson
Robert Milans
Inventors
Edward Smyth Higgins
Henry Charles Jenkins
By Foster Freeman

UNITED STATES PATENT OFFICE.

EDWARD SMITH HIGGINS AND HENRY CHARLES JENKINS, OF LONDON, ENGLAND.

JOINT FOR TYPE-WRITING MACHINES.

SPECIFICATION forming part of Letters Patent No. 502,190, dated July 25, 1893.

Application filed October 25, 1892. Serial No. 449,934. (No model.)

*To all whom it may concern:*

Be it known that we, EDWARD SMITH HIGGINS and HENRY CHARLES JENKINS, subjects of the Queen of England, residing at London, England, have invented certain new and useful Improvements in Joints for Type-Writing Machines, &c., of which the following is a specification.

This invention relates to joints which are particularly applicable for use in type-writers especially with the type-arms or levers but which may however be otherwise applied where a hinge or joint of the nature in question is required. What is particularly needed in a joint of this description is in the first place that it shall only allow of movement of rotation in a plane perpendicular to the axis of the screw or spindle upon which it works, and secondly, that it shall be capable of being tightened up and resisting continuous wear.

In the accompanying drawings we have shown the invention as applied to a type-lever of a type-writing machine.

Figure 1 is a side elevation of the complete joint and type-lever; Fig. 2 a plan of the jaw or bracket; Figs. 3 and 4 elevations showing opposite sides of the bracket; Fig. 5 a transverse section of the complete joint and a portion of the type-lever. Figs. 6 and 7 are respectively an elevation of the outer face and a section of one of the washers. Fig. 8 is a transverse section on line 8—8 of Fig. 2. Fig. 9 is a section through the lower part of the type-lever, and Figs. 10 and 11 are respectively a section and an elevation of the inner face of the other washer. Fig. 12 is a section corresponding to Fig. 10 of a modification of part of the joint.

Like letters indicate like parts throughout the drawings.

A is the jaw or bracket which is secured down to the framework of the type-writing machine by a screw passing through the hole $a$ or in any other convenient manner.

$a'$ $a^2$ are the two jaws of the bracket A between which is left a space $a^3$. The jaw $a^2$ has a cylindrical hole $a^4$ and the jaw $a'$ has a hole $a^5$ which is smaller at the inner than the outer side of the jaw so as to form a shoulder $a^6$. The width across the jaws $a'$ $a^2$ is preferably less than the width across the back end of the bracket A as shown in Fig. 2 so that when the joint is complete with the washers B and C fitted thereto it may be of practically uniform width from back to front. The washer B for fitting on to the jaw $a'$ is provided on its inner face with a short cylindrical projection $b$ which fits into the larger part of the opening $a^5$ and rests against the shoulder $a^6$. The central opening $b'$ is for the passage of the screw D the head $d'$ of which fits into the recess $b^2$ and bears against the shoulder $b^3$ of the washer B, but there is no screw thread in the opening $b'$ so that the screw may turn within the washer B. The washer B at its internal face is provided with the segmental rim $b^4$, the gap $b^5$ between the ends $b^6$ of the rim $b^4$ being of such size that when the washer is fitted on the bracket A the ends of the said rim $b^4$ will fit against the faces or shoulders $a^7$ $a^8$ of the bracket A. The washer C for the jaw $a^2$ is also formed with a rim $b^4$, and gap $b^5$, and is moreover provided with a central projection $c$ which at the part $c'$ is cylindrical for fitting accurately into the hole $a^4$ of bracket A, and at the part $c^2$ is conical for fitting into the conical hole $e$ of the type-lever E, and at the part $c^3$ cylindrical for fitting into the smaller part of the hole $a^5$ of bracket $a^2$ all as shown clearly in Fig. 5. If desired the tapered part $c^2$ may be continued to the end of $c$ the hole $a^5$ being in that case tapered to match. The central hole $c^4$ of washer C is screw-threaded for receiving the screwed portion $d$ of the screw D.

The type-lever E on each side is formed with a part or segmental collar $e'$ the external curve or diameter of which corresponds with the internal curve or diameter of the washer rim $b^4$ and the internal curve or diameter of which corresponds with the external curve or diameter of the jaws $a'$ $a^2$ of the bracket A.

The term "diameter" wherever used in this specification in reference to the segmental collar $e'$ is employed figuratively because it applies only to the circle of which the segment $e'$ forms a part.

The position of the parts of the joint when fitted together is shown in Figs. 1 and 5 the lower end of the type-lever E fitting into the recess $a^3$ of the bracket A and the internal faces of the segmental collars $e'$ resting against the external surface of the jaws $a'$ $a^2$. If desired the internal surface of $e'$ or external surface of $a'$ $a^2$ may be formed with one or more recesses for reducing friction and retaining lubricant, and the same may be done with the external surface of $e'$ and internal surface of $b^4$. The washer C is applied to one side of the bracket A its rim $b^4$ encircling the appropriate segmental collar $e'$ which consequently works between two bearing surfaces viz. the outer surface of the jaw $a^2$ and the inner surface of the rim $b^4$. The projection $c$ of washer C passes through the opening $a^4$ of bracket A, the conical aperture $e$ of type-lever E, and into the smaller part of the opening $a^5$ in the jaw $a'$. The washer B applied to the other side of the bracket A in a similar manner embraces the appropriate segmental collar $e'$ of type-lever E, its projection $b$ fitting into the larger part of the opening $a^5$ of bracket jaw $a'$. The screw D engages with the thread of hole $c^4$ and its head $d'$ is received in the recess $b^2$. The adjacent faces of the projection $b$ and that at the end of the projection $c$ are preferably brought into contact by means of the screw D so that the joint cannot be jammed tight by turning the screw D to an unnecessary extent. Should it however at any time be necessary to compensate for the wear of the joint the end of the projection $c$ may be rubbed on an oil-stone or otherwise dealt with to decrease its length to a fractional extent.

Instead of the conical part $c^2$ of the projection $c$ being formed in part with the washer C it may, as shown in Fig. 12, be formed on a sleeve fitted preferably tightly upon the projection $c$, which in this instance will be cylindrical and of the diameter of $c^3$ throughout. This arrangement enables a worn sleeve to be replaced by another without necessitating the substitution of a complete washer C and projection $c$ as would be necessary in the case of the projection $c$ of Figs. 5, 10 and 11 becoming worn to a corresponding extent.

When the parts before described are put together it will be found that a joint specially applicable to type-levers of type-writing machines and also applicable to various other machines and apparatus and having all the necessary freedom of play but without shake in any direction is formed and although modifications may be made without departing from the spirit of the invention the joint as above described is found to provide a practical solution of this joint question.

We claim—

1. In a hinge or joint such as described the combination with the two members to be jointed together of a segmental collar and washer having a rim whose internal curve or diameter corresponds with the external curve or diameter of the segmental collar substantially as described and illustrated in the accompanying drawings.

2. In a hinge or joint such as described the combination with the two members to be jointed together and a segmental collar jaw and washers of a partly cylindrical and partly conical projection substantially as described and illustrated in the accompanying drawings.

3. In a hinge or joint such as described the combination with the two members to be jointed together and a segmental collar jaw and washers of a cylindrical projection formed in part with one of the washers and a partly conical and partly cylindrical sleeve fitting thereon substantially as described and illustrated in the accompanying drawings.

4. In a joint such as described the combination with one of the members to be jointed having a conical hole of another member having a central recess and holes one cylindrical and the other stepped substantially as described and illustrated in the accompanying drawings.

5. In a joint such as described the combination with the members to be jointed one of which is provided with shoulders of a washer having a rim extending partly around it and the ends of which abut against the shoulders on the member to which it is applied substantially as described and illustrated in the accompanying drawings.

6. In a joint such as described the combination with one member having jaws $a'$ $a^2$ of a second member having the parts $e$, $e'$ and fitting between the jaws of the member and the washers B C one of which has parts $C'$ $C^2$ $C^3$ the whole being connected together by a single screw, substantially as described.

7. In a joint such as described the combination with the two members to be jointed together of two segmental collars on and a conical hole in one of the members and on the other member two perforated jaws having a recess between them two washers a segmental rim on each a cylindrical projection on one washer a partly cylindrical and partly conical projection on the other washer and a screw substantially as described and illustrated in the accompanying drawings.

8. In a joint such as described the combination with the two members to be jointed together of two segmental collars on and a conical hole in one of the members and on the other member two perforated jaws having a recess between them two washers a segmental rim on each a short cylindrical projection on one washer a longer one on the other and a partly conical and partly cylindrical sleeve fitting on the longer projection substantially as described and illustrated in the accompanying drawings.

In testimony whereof we have hereto set our hands in the presence of the two subscribing witnesses.

EDWARD SMITH HIGGINS.
HENRY CHARLES JENKINS.

Witnesses:
GEO. J. B. FRANKLIN,
THOMAS LAKE,
*Both of 17 Gracechurch St., London, Notary's Clerks.*